United States Patent Office 3,127,332
Patented Mar. 31, 1964

3,127,332
REPRODUCTION PROCESS

Leon O. Bonrud, Minneapolis, Minn., assignor to Minnesota Mining and Manufacturing Company, St. Paul, Minn., a corporation of Delaware No Drawing. Filed May 12, 1961, Ser. No. 109,529
6 Claims. (Cl. 204—18)

This invention relates to a new and useful method for producing images using thermal-electro-conductivity techniques. More specifically, a pre-selected heat image is reproduced by contacting a sheet material capable of experiencing an electrical conductive pattern from a heat image and by subsequently developing a visible image on the areas of differential conductivity by known electroconductivity methods.

The making of visible reproductions by electrostatic deposition is well known. A second method for the production of visible images by electrolytic deposition is described in the application of Johnson and Neher, S.N. 575,070, filed March 30, 1956, now U.S. Patent No. 3,010,883. The Johnson and Neher application also describes techniques useful in the preparation of a photoconductor sheet of the type that may be used in this invention.

An object of this invention is to teach a new method of reproducing images utilizing, as the last step, these known techniques as the means of producing a visible image.

Because the image to be reproduced is a heat image, several specialized and unique applications are made possible by the process of this invention. For instance, infrared photographic techniques may be combined with the electrodeposition of images; heat images from various bodies can be developed by focusing of the image on the sheet materials utilized in this invention; and direct contact of the sheet material with hot objects can serve as a graphic means for reproducing the heat patterns of the object.

Various other objects and advantages to the innovation embodied in this invention will become apparent upon reading the full specification or be obvious to experienced technicians in the art of electrodeposition of visible images.

Broadly speaking, the process of this invention makes possible the production of a visible image on a sheet material having uniform electrical conductivity capable of experiencing a heat-induced electrical conductive pattern in an image-wise manner by applying a heat image of varying intensity to pre-selected areas of the sheet material. The pre-selected areas are heated to produce areas of differential electrical conductivity. The temperature to which areas are heated varies with the material, i.e., the temperature at which a sufficient differential change of electrical conductivity is produced to allow development of a visible image. It is important that a significant thermal gradient be maintained between adjacent exposed and unexposed areas of the sheet material so that a high differential in electrical conductivity will result.

With a zinc oxide photoconductor, the temperature range is typically 50–125° C., and with plastic films 125–200° C. Electrodeposition of a visible image on the sheet material is accomplished by known techniques utilizing the areas of differential electrical conductivity as the areas of deposition.

A particularly suitable sheet material is composed of a photoconductor bonded to an electrically conductive and radiation absorbing backing. One practical and preferred method for the production of backings of this type is to vapor deposit a metallic film, such as aluminum or gold onto the surface of a transparent film. Illustrative transparent films are polyester films and cellulose acetate. Heat transfer from the backing to the photoconductor must be favored rather than dissipation of the heat image throughout the backing. Accordingly, the thickness of the metallic film should not exceed 0.2 micron and may be as thin as 0.01 micron.

It will be appreciated that an electrical conductive pattern can be thermally induced according to a pre-selected image pattern in materials, such as plastic films of cellulose acetate, polystyrene, polyvinyl chloride, and polyvinylidene chloride and as such they may be employed in the broad practice of the principal process of this invention. For instance, the plastic film surface is charged wtih corona discharge, heated in an image-wise fashion, dusted with an electroscopic toner powder which adheres according to image-wise electrical charge pattern remaining after heat exposure, and the powder is then fused in place.

In the use of a photoconductor sheet in the electrolytic deposition of a visible image, the photoconductor particles are first uniformly rendered photoconductive. This is conveniently accomplished by exposing the entire photoconductor sheet to a light source, such as visible light, ultraviolet or X-ray radiation. A representative exposure is 5 seconds to a tungsten light source with an intensity of about 300 foot candles and a color temperature of 3100° Kelvin. The heat image may then be transferred to the pre-selected areas of the photoconductor sheet by any convenient method. Suitable methods of transfer of the heat image to the photoconductive film include thermal conduction and radiation from the original. In the latter case, the heat image is generated in a radiation absorbing material in the photoconductor sheet and transferred to the photoconductor by thermal conduction. The radiation-absorbing material may be dispersed throughout the photoconductive layer or formed as a layer in contact with the photoconductor layer. The photoconductor particles are heated according to the image pattern to destroy or reduce the photoconductivity of the photoconductor particles. One simple method is to apply a letterpress or other similar object which has been heated to an elevated temperature against either surface of the photoconductor sheet.

The preferred method is, however, to project an infrared image upon the photoconductor sheet, such as through a transparency, thereby permitting the heat absorbing material to be selectively heated by the infra-red rays. Heat is conducted to the adjacent photoconductor particles, and the photoconductivity of the particles so heated is diminished. A positive image can now be developed by depositing a metal, such as silver, in the most conductive areas of the film.

The heat image may be produced by placing a transparency between the infra-red source and the photoconductor sheet. A negative image can be produced by placing a transparency in contact with the photoconductor sheet in a manner so to effect heat transfer from the image areas of the transparency. For instance, the transparency can be subjected to infra-red radiation, thereby heating the dark portion. Heat is then conducted from these dark portions to the photoconductor sheet such that the photoconductor is heated in an image-wise fashion.

In the positive process, heat flow from the transparency is minimized, and the transparency serves to allow a differential radiation pattern to be projected upon the photoconductor sheet. The heat-absorbing material is selectively heated according to the radiation pattern and as described above, the heat is conducted to the photoconductor particles in an image-wise fashion.

The following examples are illustrative of the preparation of the compositions of this invention in which all "parts" are expressed as parts by weight and all "percentages" are expressed as percent by weight unless specified otherwise.

*Example I*

A light-sensitive sheet material was prepared as follows:

A Mylar polyester transparent flexible film having a thickness of about 2 mils was first metalized on one surface by vapor deposition in a vacuum, with an extremely thin coating of aluminum (about 0.05 micron). The coating was opaque and was found to have a surface resistivity of about 1 ohm per square. Over this metal layer was then applied a suspension of 600 grams of New Jersey Zinc Company's U.S.P. 12 grade oxide zinc powder in a solution of 375 grams of toluene, 375 grams of ethyl acetate, 150 grams of "Pliolite" resin (a resinous copolymer of butadiene and styrene, serving as a binder), the mixture having been ball-milled with ½" diameter glass balls in a gallon jar for 15 hours. The zinc oxide mixture applied to the aluminum surface also contained 0.02 percent by weight based on the weight of zinc oxide "Phosphine R" (C.I. 46005), a product of the General Dyestuff Corporation. The wet mixture was coated on the aluminum layer to a 4-mil thickness in subdued light and dried in the dark. The dry thickness of the zinc oxide coating was about 0.6 mil.

This photoconductor sheet was flooded by placing it under a visible light (300 foot-candles at a color temperature of 3150° Kelvin for 5 seconds) to render the entire sheet photoconductive. A transparent cellulose acetate sheet containing an etched vapor coated copper image, prepared as described in my co-pending application S.N. 20,295, filed April 6, 1960, was placed behind the photoconductor sheet in contact with the polyester backing. The transparency was irradiated with infra-red from a tungsten source while in contact with the photoconductor sheet at an exposure of about 1 watt-second per square inch.

A developer solution prepared by mixing a solution of zinc nitrate (3 parts) and disodium ethylene tetraacetic acid zinc (II) (2 parts) in distilled water (50 parts) and silver nitrate (0.5 part) dissolved in distilled water (44.5 parts) was applied to the photoconductive layer of zinc oxide particles with a cellulosic sponge, which was in contact with a stainless steel plate, serving as the anode for electrolytic deposition of an image on the zinc oxide surface, which was made the cathode.

A potential of about 30 volts direct current was applied between the stainless steel anode and the aluminum layer behind the photoconductor layer. A visible, dark deposit of silver and zinc was formed upon the photoconductive portion of the sheet by applying an electrical current density of about 30 milliamperes per square centimeter to the conducting areas. Thus, a positive copy of the transparency was produced, since the metal deposit upon the photoconductor sheet corresponded to the opaque portions of the transparency.

*Example II*

A light-sensitive sheet material was prepared as described in Example I.

This photoconductor sheet was flooded by placing it under a visible light (300 foot-candles at a color temperature 3150° Kelvin for 5 seconds) to render the entire sheet photoconductive. An original consisting of an image of a carbon containing ink on translucent paper was placed behind the photoconductor sheet with the ink image being in contact with the polyester backing of the light-sensitive sheet material. The paper was subjected to infra-red radiation from a tungsten source while in contact with the photoconductor sheet at an exposure of about 1 watt-second per square inch.

A developer solution prepared as described in Example I was applied to the photoconductive layer of zinc oxide particles with a cellulosic sponge, which was in contact with a stainless steel plate, serving as the anode for electrolytic deposition of an image on the zinc oxide surface, which was made the cathode.

A potential of about 30 volts direct current was applied between the stainless steel anode and the aluminum layer behind the photoconductive layer. A visible, dark deposit of silver and zinc was formed upon the photoconductive portion of the sheet by applying an electrical current density of about 30 milliamperes per square centimeter to the conducting areas. Thus, a negative copy of the original was produced, since the metal deposit upon the photoconductor sheet corresponded to the light-colored portions of the original.

I claim:

1. A process for producing a visible image on a photoconductor sheet material having uniform electrical conductivity capable of experiencing a heat-induced electrical conductive pattern in an image-wise manner which comprises applying a heat image of varying intensity to pre-selected areas of the sheet material by heating the pre-selected areas to a temperature of at least 50° C. thereby destroying conductivity in said pre-selected areas and subsequently electrodepositing a visible image on the sheet.

2. A process for preparing a visible image on the surface of a photoconductor sheet material in which the photoconductor is supported on a backing material to which has been added an electrically conductive and radiation absorbing film, said film having a thickness of 0.01 to 0.2 micron, which comprises exposing the photoconductor surface to a light source to render the entire surface photoconductive; applying a heat image to the photoconductor, thereby destroying the photoconductivity of the photoconductor in the pre-selected heated areas and subsequently developing an image on the photoconductor surface by means of an electrical current.

3. A process for preparing a visible image on the surface of a photoconductor sheet material in which the photoconductor is supported on a backing material to which has been added an electrically conductive and radiation absorbing film, said film having a thickness of 0.01 to 0.2 micron, which comprises exposing the photoconductor surface to a light source to render the entire surface photoconductive; placing a transparency containing dark, non-transparent, heat absorbing areas in contact with the photoconductor sheet and subjecting the transparency to radiation, thereby selectively heating portions of the conductive backing sheet and adjacent photoconductor particles and destroying the photoconductivity of the photoconductor particles in the preselected heated areas and subsequently developing a visible image on the photoconductor surface by means of an electrical current.

4. A positive copying process for preparing a visible image on the surface of a light colored photoconductor sheet material in which the photoconductor is supported on a transparent backing material of low thermal conductivity to which has been added an electrically conductive and radiation absorbing film, said film having a thickness of 0.01 to 0.2 micron which comprises exposing the photoconductor surface to a light source to render the entire surface photoconductive; placing a transparency containing dark, non-transparent, heat absorbing areas in contact with the transparent backing of the photoconductor sheet and subjecting the transparency to radiation, thereby selectively radiating the radiation absorbing film and generating a heat pattern in said radiation absorbing film, said heat pattern being conducted to the adjacent photoconductor and destroying the photoconductivity of the photoconductor and subsequently developing a dark visible image on the photoconductor surface corresponding to the opaque areas of the transparency by means of an electrical current.

5. A negative copying process for preparing a visible image on the surface of a light colored photoconductor sheet material in which the photoconductor is supported on a backing material to which has been added an electrically conductive film, said film having a thickness of 0.01 to 0.2 micron which comprises exposing the photoconductor surface to a light source to render the entire surface photoconductive; placing a transparency containing dark, non-transparent, heat absorbing areas in contact with the photoconductor sheet and subjecting the transparency to radiation, thereby selectively heating the areas of greatest radiation absorption of the transparency and conducting the heat from the transparency through the backing material to the photoconductor particles in an image-wise fashion and destroying the photoconductivity of the photoconductor particles in the pre-selected heated areas and subsequently developing a visible image on the photoconductor surface corresponding to the transparent portions of the transparency by means of an electrical current.

6. A process for preparing a visible image on the surface of a photoconductor sheet material in which the photoconductor is supported on a backing material to which has been added an electrically conductive film, said film having a thickness of 0.01 to 0.2 micron which comprises exposing the photoconductor surface to a light source to render the entire surface photoconductive; heating selective portions of the photoconductor by thermal conduction from a heat pattern, thereby destroying the photoconductivity of the photoconductor in the heated areas and subsequently developing a visible image on the photoconductor surface by means of an electrical current.

References Cited in the file of this patent

UNITED STATES PATENTS 2,946,682 Lauriello ---------------- July 26, 1960
3,010,883 Johnson et al. ----------- Nov. 28, 1961

FOREIGN PATENTS 215,754 Australia --------------- June 23, 1958

OTHER REFERENCES

Miller: "Physical Review," volume 60, pages 890–5, Dec. 15, 1941.